United States Patent
Hartley et al.

(10) Patent No.: US 10,235,303 B2
(45) Date of Patent: Mar. 19, 2019

(54) SECURE ENTRY AND EXIT FOR SOFTWARE MODULES PROTECTED BY CONTROLLED ENCRYPTION KEY MANAGEMENT

(71) Applicant: QUALCOMM Incorporated, San Diego, CA (US)

(72) Inventors: David Hartley, Berlin (DE); Roberto Avanzi, Munich (DE); Rosario Cammarota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 15/232,723

(22) Filed: Aug. 9, 2016

(65) Prior Publication Data

US 2017/0075820 A1   Mar. 16, 2017

Related U.S. Application Data

(60) Provisional application No. 62/216,986, filed on Sep. 10, 2015.

(51) Int. Cl.
*G06F 12/14*   (2006.01)
*G06F 21/12*   (2013.01)
(Continued)

(52) U.S. Cl.
CPC ........ *G06F 12/1408* (2013.01); *G06F 21/121* (2013.01); *G06F 21/125* (2013.01);
(Continued)

(58) Field of Classification Search
CPC .......... G06F 21/14; G06F 21/51; G06F 21/74; G06F 21/125; H04L 63/145
See application file for complete search history.

(56) References Cited

U.S. PATENT DOCUMENTS 6,986,052 B1 *   1/2006   Mittal ................. G06F 12/1441
                                                         711/E12.097
7,139,915 B2   11/2006   Detreville et al.
(Continued)

FOREIGN PATENT DOCUMENTS

WO         0203208 A2      1/2002

OTHER PUBLICATIONS

Second Written Opinion from International Application No. PCT/US2016/049383, dated Jul. 19, 2017, 5 Pages.
(Continued)

*Primary Examiner* — Dao Q Ho
(74) *Attorney, Agent, or Firm* — Hunter Clark PLLC

(57) ABSTRACT

Techniques for protecting software in a computing device are provided. A method according to these techniques includes receiving a request from a non-secure software module to execute an instruction of a secure software module comprising encrypted program code, determining whether the instruction comprises an instruction associated with a controlled point of entry to the secure software module accessible outside of the secure software module, executing one or more instructions of the secure software module responsive to the instruction comprising an instruction associated with the controlled point of entry to the secure software module, and controlling exit from the secure software module to return execution to the non-secure software module.

30 Claims, 6 Drawing Sheets

(51) Int. Cl.
  *G06F 21/62* (2013.01)
  *H04L 29/06* (2006.01)
  *G06F 21/14* (2013.01)
  *G06F 21/74* (2013.01)

(52) U.S. Cl.
  CPC .............. *G06F 21/14* (2013.01); *G06F 21/62* (2013.01); *G06F 21/74* (2013.01); *H04L 63/145* (2013.01); *G06F 2212/1052* (2013.01); *G06F 2221/0755* (2013.01)

(56) References Cited

U.S. PATENT DOCUMENTS

| | | | |
|---|---|---|---|
| 7,356,705 | B2 | 4/2008 | Ting |
| 8,533,859 | B2 | 9/2013 | Keshavachar et al. |
| 2006/0259764 | A1 | 11/2006 | Asal et al. |
| 2012/0079281 | A1 | 3/2012 | Lowenstein et al. |
| 2015/0302219 | A1* | 10/2015 | Lahteenmaki .......... G06F 21/74 726/29 |
| 2016/0006724 | A1 | 1/2016 | Vlot et al. |

OTHER PUBLICATIONS

International Preliminary Report on Patentability—PCT/US2016/049383 The International Bureau of WIPO—Geneva, Switzerland, dated Oct. 20, 2017.
International Search Report and Written Opinion—PCT/US2016/049383—ISA/EPO—dated Nov. 9, 2016—10 pgs.

\* cited by examiner

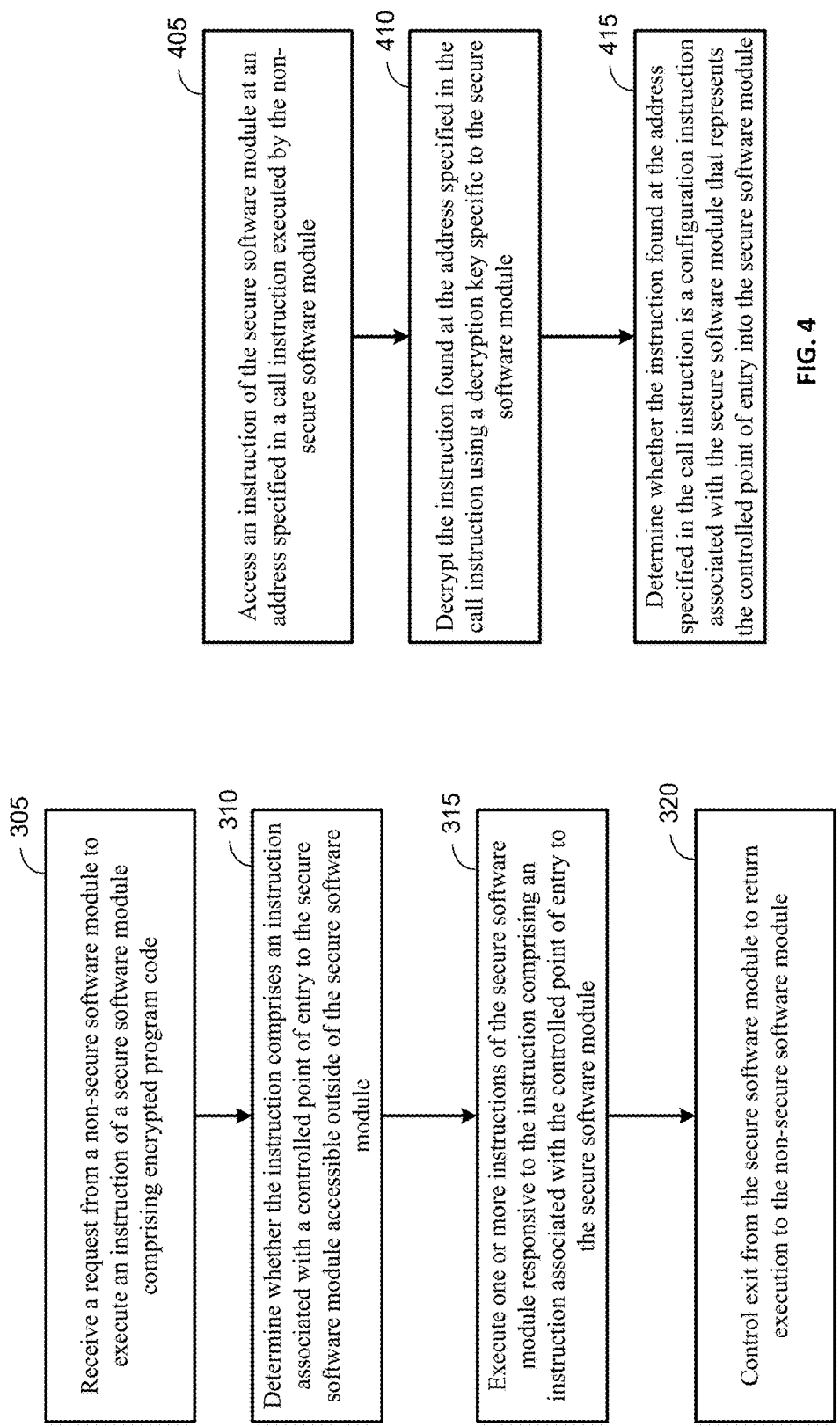

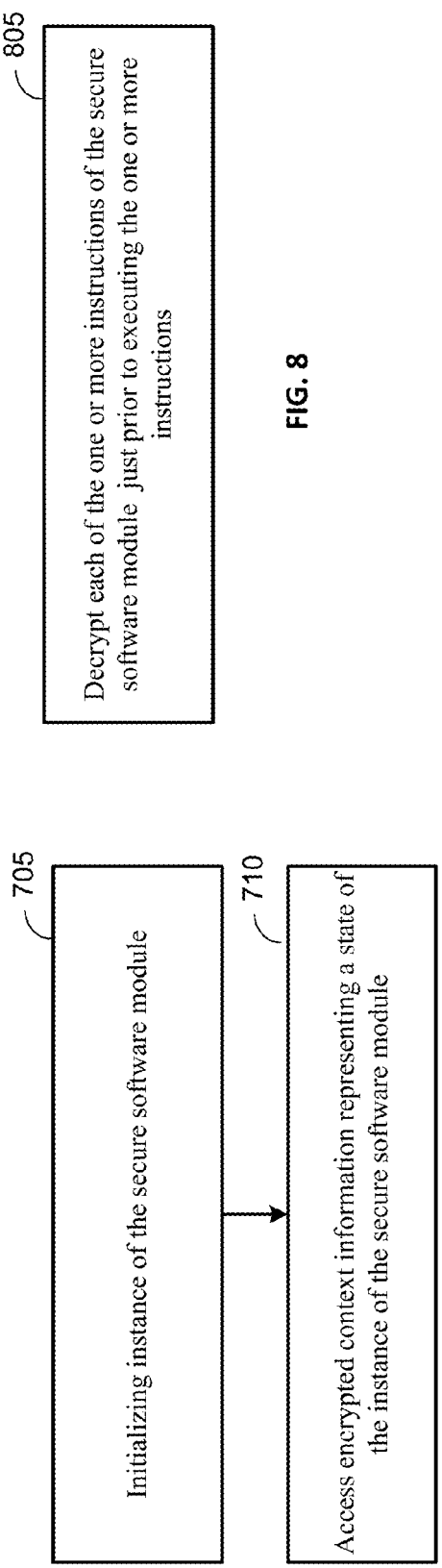

SECURE ENTRY AND EXIT FOR SOFTWARE MODULES PROTECTED BY CONTROLLED ENCRYPTION KEY MANAGEMENT

CROSS REFERENCE TO RELATED APPLICATION

This application claims priority to U.S. Provisional Patent Application Ser. No. 62/216,986, entitled "SECURE ENTRY AND EXIT FOR SOFTWARE MODULES PROTECTED BY CONTROLLED ENCRYPTION KEY MANAGEMENT," filed on Sep. 10, 2015, all of which are assigned to the assignee hereof and incorporated by reference.

BACKGROUND

Software can include valuable intellectual property that hackers or competitors may wish to extract from the software and to exploit for their own purposes. Some conventional solutions, such as trusted execution environments, can provide protection for data on a computing device. However, these solutions do not provide protection for the software code itself.

SUMMARY

An example method for protecting software in a computing device according to the disclosure includes receiving a request from a non-secure software module to execute an instruction of a secure software module comprising encrypted program code; determining whether the instruction comprises an instruction associated with a controlled point of entry to the secure software module accessible outside of the secure software module; executing one or more instructions of the secure software module responsive to the instruction comprising an instruction associated with the controlled point of entry to the secure software module; and controlling exit from the secure software module to return execution to the non-secure software module.

Implementations of such a method can include one or more of the following features. The instruction is a call instruction, and determining whether the instruction comprises the instruction associated with the controlled point of entry to the secure software module accessible outside of the secure software module includes: accessing an instruction of the secure software module at an address specified in the call instruction executed by the non-secure software module; decrypting the instruction found at the address specified in the call instruction using a decryption key specific to the secure software module; and determining whether the instruction found at the address specified in the call instruction is a configuration instruction associated with the secure software module that represents the controlled point of entry into the secure software module. Prohibiting access to the secure software module responsive to the instruction found at the address specified in the call instruction not being the configuration instruction; and performing an action in response to the address specified in the call instruction not being the configuration instruction. Executing the one or more instructions of the secure software module responsive to the instruction comprising an instruction associated with the controlled point of entry to the secure software module includes initializing an instance of the secure software module. Initializing the instance of the secure software module includes accessing encrypted context information representing a state of the instance of the secure software module. Controlling the exit from the secure software module to return execution to the non-secure software module includes: storing encrypted context information representing a state of the instance the secure software module in the secure memory; and stopping decryption of instructions of the secure software module. Controlling the exit from the secure software module to return execution to the non-secure software module includes: overriding exception handling while executing instructions of the secure software module; storing encrypted context information representing a state of the instance the secure software module in the secure memory; and stopping decryption of instructions of the secure software module responsive to an exception occurring. Executing the one or more instructions of the secure software module responsive to the instruction comprising an instruction associated with the controlled point of entry to the secure software module includes decrypting each of the one or more instructions of the secure software module associated with an instance of the secure software module being executed just prior to executing the one or more instructions. Decrypting each of the one or more instructions of the secure software module associated with the instance of the secure software module being executed just prior to executing the one or more instructions includes decrypting each of the one or more instructions using an encryption key that is associated with the secure software module.

An example apparatus according to the disclosure includes means for receiving a request from a non-secure software module to execute an instruction of a secure software module comprising encrypted program code; means for determining whether the instruction comprises an instruction associated with a controlled point of entry to the secure software module accessible outside of the secure software module; means for executing one or more instructions of the secure software module responsive to the instruction comprising an instruction associated with the controlled point of entry to the secure software module; and means for controlling exit from the secure software module to return execution to the non-secure software module.

Implementations of such an apparatus can include one or more of the following features. The instruction is a call instruction, and the means for determining whether the instruction comprises the instruction associated with the controlled point of entry to the secure software module accessible outside of the secure software module includes: means for accessing an instruction of the secure software module at an address specified in the call instruction executed by the non-secure software module; means for decrypting the instruction found at the address specified in the call instruction using a decryption key specific to the secure software module; and means for determining whether the instruction found at the address specified in the call instruction is a configuration instruction associated with the secure software module that represents the controlled point of entry into the secure software module. Means for prohibiting access to the secure software module responsive to the instruction found at the address specified in the call instruction not being the configuration instruction; and means for performing an action in response to the address specified in the call instruction not being the configuration instruction. The means for executing the one or more instructions of the secure software module responsive to the instruction comprising an instruction associated with the controlled point of entry to the secure software module includes means for initializing an instance of the secure software module. The means for initializing the instance of the secure software module include means for accessing encrypted context information representing a state of the instance of the secure software module. The means for controlling the exit from the secure software module to return execution to the non-secure software module includes: means for storing encrypted context information representing a state of the instance the secure software module in the secure memory; and means for stopping decryption of instructions of the secure software module. The means for controlling the exit from the secure software module to return execution to the non-secure software module includes: means for overriding exception handling while executing instructions of the secure software module; means for storing encrypted context information representing a state of the instance the secure software module in the secure memory; and means for stopping decryption of instructions of the secure software module responsive to an exception occurring.

An example apparatus according to the disclosure includes a memory and a processor coupled to the memory. The processor is configured to receive a request from a non-secure software module to execute an instruction of a secure software module comprising encrypted program code; determine whether the instruction comprises an instruction associated with a controlled point of entry to the secure software module accessible outside of the secure software module; execute one or more instructions of the secure software module responsive to the instruction comprising an instruction associated with the controlled point of entry to the secure software module; and control exit from the secure software module to return execution to the non-secure software module.

Implementations of such an apparatus can include one or more of the following features. The instruction is a call instruction, and the processor being configured to determine whether the instruction comprises the instruction associated with the controlled point of entry to the secure software module accessible outside of the secure software module is further configured to: access an instruction of the secure software module at an address specified in the call instruction executed by the non-secure software module; decrypt the instruction found at the address specified in the call instruction using a decryption key specific to the secure software module; and determine whether the instruction found at the address specified in the call instruction is a configuration instruction associated with the secure software module that represents the controlled point of entry into the secure software module. The processor is further configured to: prohibit access to the secure software module responsive to the instruction found at the address specified in the call instruction not being the configuration instruction; and perform an action in response to the address specified in the call instruction not being the configuration instruction. The processor being configured to execute the one or more instructions of the secure software module responsive to the instruction comprising an instruction associated with the controlled point of entry to the secure software module is further configured to initialize an instance of the secure software module. The processor being configured to initialize the instance of the secure software module is further configured to access encrypted context information representing a state of the instance of the secure software module. The processor being configured to control the exit from the secure software module to return execution to the non-secure software module is further configured to: store encrypted context information representing a state of the instance the secure software module in the secure portion of the memory; and stop decryption of instructions of the secure software module. The processor being configured to control the exit from the secure software module to return execution to the non-secure software module is further configured to: override exception handling while executing instructions of the secure software module; store encrypted context information representing a state of the instance the secure software module in the secure portion of the memory; and stop decryption of instructions of the secure software module responsive to an exception occurring.

An example non-transitory, computer-readable medium, having stored thereon computer-readable instructions for protecting software in a computing device according to the disclosure includes instructions configured to cause the computing device to receive a request from a non-secure software module to: execute an instruction of a secure software module comprising encrypted program code; determine whether the instruction comprises an instruction associated with a controlled point of entry to the secure software module accessible outside of the secure software module; execute one or more instructions of the secure software module responsive to the instruction comprising an instruction associated with the controlled point of entry to the secure software module; and control exit from the secure software module to return execution to the non-secure software module.

Implementations of such a non-transitory, computer-readable medium can include one or more of the following features. The instruction comprises a call instruction, and wherein the instructions configured to cause the computing device to determine whether the instruction comprises the instruction associated with the controlled point of entry to the secure software module accessible outside of the secure software module include instructions configured to cause the computing device to: access an instruction of the secure software module at an address specified in the call instruction executed by the non-secure software module; decrypt the instruction found at the address specified in the call instruction using a decryption key specific to the secure software module; and determine whether the instruction found at the address specified in the call instruction is a configuration instruction associated with the secure software module that represents the controlled point of entry into the secure software module. Instructions configured to cause the computing device to: prohibit access to the secure software module responsive to the instruction found at the address specified in the call instruction not being the configuration instruction; and perform an action in response to the address specified in the call instruction not being the configuration instruction. The instructions configured to cause the computing device to execute the one or more instructions of the secure software module responsive to the instruction comprising an instruction associated with the controlled point of entry to the secure software module include instructions configured to cause the computing device to initialize an instance of the secure software module. The instructions configured to cause the computing device to initialize the instance of the secure software module include instructions configured to cause the computing device to access encrypted context information representing a state of the instance of the secure software module. The instructions configured to cause the computing device to control the exit from the secure software module to return execution to the non-secure software module include instructions configured to cause the computing device to: store encrypted context information representing a state of the instance the secure software module in the secure memory; and stop decryption of instructions of the secure software module. The instructions configured to cause the computing device to control the exit from the secure software module to return execution to the non-secure software module include instructions configured to cause the computing device to: override exception handling while executing instructions of the secure software module; store encrypted context information representing a state of the instance the secure software module in the secure memory; and stop decryption of instructions of the secure software module responsive to an exception occurring.

BRIEF DESCRIPTION OF THE DRAWING

FIG. 3 is a flow diagram of an example process for protecting software in a computing device according to the techniques disclosed herein.

FIG. 4 is a flow diagram of an example process for determining whether an instruction is a controlled point of entry into a secure software module according to the techniques disclosed herein.

FIG. 7 is a flow diagram of an example process for initializing a secure software module according to the techniques disclosed herein.

FIG. 8 is a flow diagram of an example process for executing instructions of a secure software module according to the techniques disclosed herein.

Like reference symbols in the various drawings indicate like elements, in accordance with certain example implementations.

DETAILED DESCRIPTION

Described herein are methods, systems, devices, computer readable media, and other implementations, for protecting secure software modules. The techniques described herein provide for controlled entry and exit from secure software modules protected by controlled encryption key management. The program code of the secure software module is stored in an encrypted form and is decrypted just prior to the execution of the software code by a processor of the computing device. The accompanying drawings and the description below discusses each of these approaches in greater detail.

Example embodiments include, for example, methods including one or more of:

Methods, systems, devices, computer readable media, and other implementations for protecting software modules. An example method according to these techniques includes:

receiving a request from a non-secure software module to execute an instruction of a secure software module comprising encrypted program code;

determining whether the instruction comprises an instruction associated with a controlled point of entry to the secure software module accessible outside of the secure software module;

executing one or more instructions of the secure software module responsive to the instruction comprising an instruction associated with the controlled point of entry to the secure software module; and controlling exit from the secure software module to return execution to the non-secure software module.

Implementations of such example systems and methods are illustrated in the accompanying figures and discussed in detail in the following example implementations.

Figure 1:
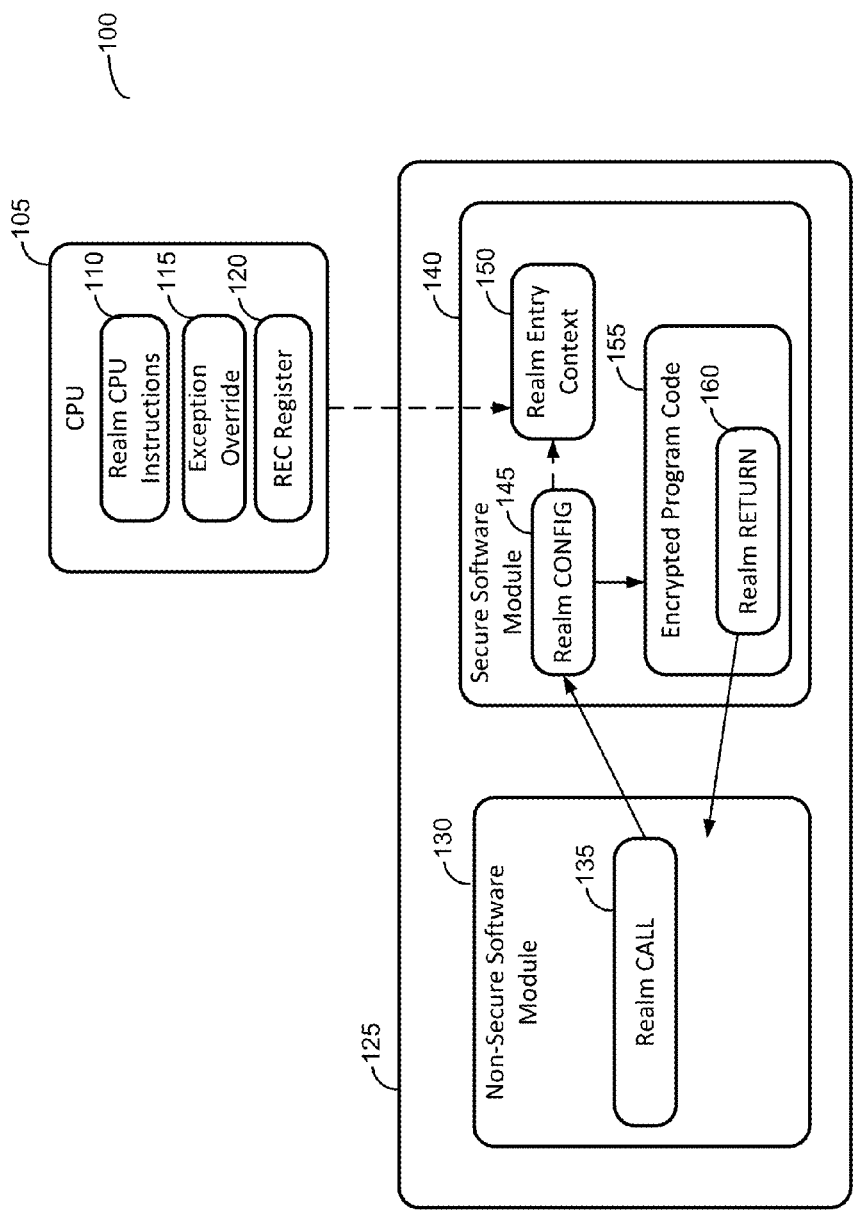
FIG. 1 is a schematic diagram of an example computing device, in accordance with certain example implementations.

FIG. 1 is a schematic diagram of an example computing device 100 that can be used to implement the techniques disclosed herein. The computing device 100 can comprise a computer server and can be part of a cloud computing environment. The computing device 100 can also be other types of computing device, such as a laptop computer, tablet computer, mobile device, or wearable computing device. The computing device 100 includes a processor 105 and a memory 125. The memory 125 is communicatively coupled to the processor 105 and can be used to store data and/or executable program code that can be executed by the processor 105. The processor 105 can be configured to execute both non-secure software modules 130 and secure software modules 140. Non-secure software modules 130 comprise executable program instructions that can be executed by the processor 105 to perform one or more functions. The unprotected software code is stored in an unencrypted form in the memory 125 and may potentially be accessible to other processes being executed on the computing device 100. The unprotected software code may comprise one or more applications that are executed by the computing device 100 and/or components of a high-level operating system (HLOS) that is executed by the computing device 100. The protected software code comprises one or more secure software modules 140 that comprise sensitive program code that is stored in an encrypted form in the memory 125 of the computing device 100. The sensitive program code may comprise valuable intellectual property that a developer of the code wishes to protect or may comprise code for performing transactions that may access or modify sensitive data, such as financial data, medical data, or other such data that an attacker may wish to obtain or modify by attacking the program code. The protected software code can be stored in an encrypted form until just prior to execution. Just prior to execution, the relevant program code can be decrypted and provided to the processor 105 for execution.

The computing device 100 can be configured to execute secure software modules. Each secure software module 140 can be stored in a portion of the memory 125 which is also referred to herein as a "realm" or "software realm" of the secure software module 140. The secure software module 140 includes encrypted program code 155. The secure software module 140 can also include a realm entry context 150 and a realm configuration instruction 145. The realm configuration instruction 145 serves as an initial point of entry into the program code of the secure software module 140. The processor 105 can control entry into the program code of the secure software module 140 by preventing jumps into the code to memory locations other than the designated entry point into the program code of the secure software module 140 via a realm call instruction 135. Calls to enter into the program code of the secure software module 140 at other addresses other than the realm configuration instruction 145 can be rejected by the processor 105, which can prevent an attacker from attempting to jump to an arbitrary address within the program code of the secure software module 140. The encrypted program code 155 of secure software module 140 is kept in an encrypted form and is only decrypted on an as-needed basis when the processor 105 is about to execute an instruction of the encrypted program code 155.

The computing device 100 can also be configured to allow non-secure software modules 130 to call secure software modules 140. The processor 105 can implement one or more realm-specific CPU instructions 110. These instructions can include a realm call instruction 135, a realm configuration instruction 145, and a realm return instruction 160. Other realm-specific instructions can also be implemented by the processor 105. The processor 105 can be configured to implement a realm call instruction 135 that provides an interface for unprotected program code to call program code of the secure software module 140. The realm call instruction 135 can be configured to accept an address of the realm configuration instruction 145 as a parameter. The realm call instruction 135 can comprise an unencrypted instruction that is accessible to non-secure software modules 130. The processor 105 can be configured to access the address specified in the realm call instruction 135, to decrypt the instruction located at the specified address, and to make a determination whether the instruction at the address specified by the realm call instruction 135 is a realm configuration instruction 145. The protected software can comprise multiple secure software modules 140 or realms, and each realm can be associated with its own realm-specific or secure software module-specific encryption key. The encryption keys may in some implementations be managed by a key management subsystem of the trusted execution environment of the computing device 100. The processor 105 can be configured to abort the realm call instruction 135 responsive to the decrypted content located at the address specified by the realm call instruction 135 not mapping to a realm configuration instruction 145. The processor 105 can be configured to execute the realm configuration instruction 145 responsive to the address specified in the realm call instruction matching the correct address of the realm configuration instruction 145. Each secure software module 140 can be associated with its own realm configuration instruction 145, and the non-secure software module 130 can execute the software in a particular realm by executing a realm call instruction 135 to the address of the realm configuration instruction 145 associated with that secure software module 140, which is the entry point for that specific secure software module 140.

The realm configuration instruction 145 is executed by the processor 105 to prepare the secure software module 140 for execution. The realm configuration instruction 145 accesses a realm entry context 150 associated with the secure software module 140. The realm entry context 150 stored in the secure software module 140. The realm entry context 150 stores state information for the secure software module 140. The secure software module 140 implemented in the secure software module 140 may be in one of several states: (1) a free state, (2) a running state, or (3) a paused state. When the realm is in the free state, there is not a running or paused instance of the realm, and a call may be made into the realm from the non-secure software module 130. In the implementation illustrated in FIG. 1, only one instance of each realm may be running or paused at a time. If the realm is already running or paused, and a subsequent realm call instruction is executed, the processor 105 can be configured to block on the realm configuration instruction 145 until the realm returns to a free state. If the realm was in a free state, the processor 105 can be configured to execute the realm configuration instruction 145 to access the realm entry context 150 for the realm which comprises data that can be used to initialize the state of the realm. The realm entry context 150 may include values that may be loaded into one or more registers of the processor 105. The realm entry context 150 is stored in the secure software module 140 in an encrypted form. The processor 105 can be configured to access the encryption key associated with the realm and to decrypt the realm entry context 150. The encryption key may be managed by a key management subsystem of the trusted execution environment of the computing device 100. The processor 105 can be configured to authenticate the realm entry context 150 upon decryption to ensure that the realm entry context 150 has not been corrupted or tampered with while stored in the secure software module 140. The realm entry context 150 information is decrypted by the processor 105 as needed and is not accessible by the non-secure software module 130. The address of the realm entry context 150 can be stored in a realm entry context (REC) register 120 of the processor 105. Once the realm entry context 150 has been loaded, the processor 105 can update the realm entry context 150 to indicate that the realm is in the running state. While in the running state, the processor 105 can be configured to execute one or more instructions of the program code comprising the secure software module 140. The processor 105 can be configured to update the information stored in one or more registers of the processor 105 and/or the realm entry context 150 as the one or more instructions of the program code 155 of the secure software module 140 are executed by the processor 105.

The processor 105 is configured to access and to decrypt each instruction of the program code 155 of the secure software module 140 only as needed for execution to ensure that the program code remains protected. The processor 105 can be configured to access and to decrypt the instructions of the program code 155 of the secure software module 140 only if the realm configuration instruction 145 was executed successfully and the address of the program code 155 of the secure software module 140 was provided to the processor 105.

The processor 105 can also be configured to place the realm into the paused state responsive to an external call. For example, the program code 155 of the secure software module 140 can be configured to make a call to a library or software module of the non-secure software module 130. The processor can also be configured to place the realm in a paused state due to an exception, such as an interrupt or a context switch. The exception override handling logic 115 of the processor 105 can be configured to store the current state of the realm in the realm entry context 150 stored at the address specified in the REC register 120. The realm entry context 150 that has been stored can be used to resume execution of the realm upon completion of the execution of the library or module of the non-secure software module 130 that is called from the program code 155 of the secure software module 140.

Figure 2:
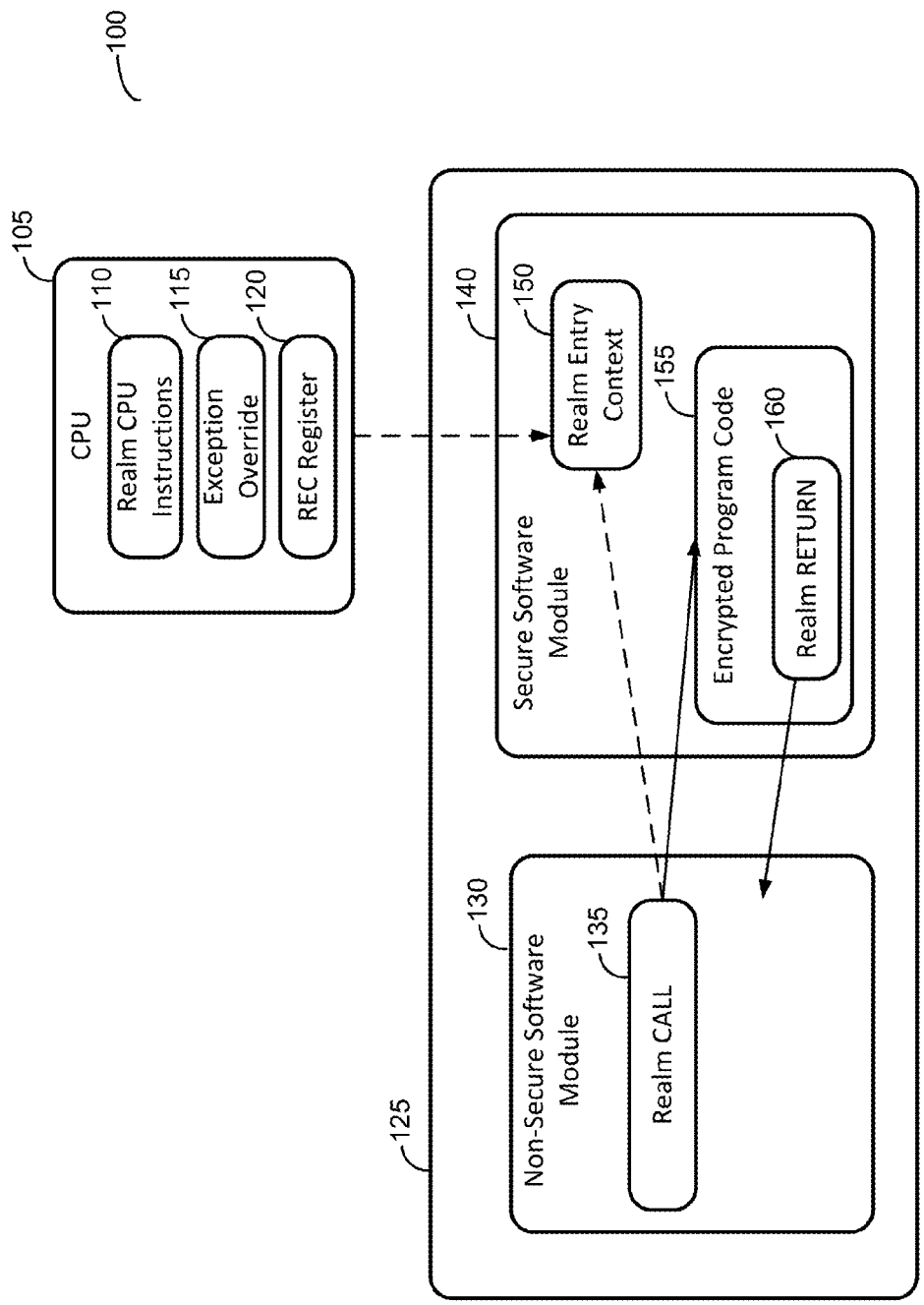
FIG. 2 is a schematic diagram of another computing device, in accordance with certain example implementations.

FIG. 2 is a schematic diagram of an example computing device 100 that can be used to implement the techniques disclosed herein. The example illustrate in FIG. 2 illustrates an alternative example of the computing device 100 in which the functionality of the realm configuration instruction has been integrated into the realm call instructions 135, such that the realm configuration instruction is not required.

The functionality of the realm call instruction and the realm configuration instruction may be merged into the realm call instruction, such that the realm call instruction is responsible for accessing the realm entry context 150 and initializing the secure software module 140 using the realm entry context. Alternatively, the realm call instruction may call the realm configuration instruction and pass the address of the realm entry context 150 to the realm configuration instruction, and the realm configuration instruction can proceed to initialize the secure software module 140 using the realm entry context 150 referenced by the address provided with the realm call instruction.

The realm call instruction can be configured to accept the address the realm entry context 150 and the thread or process identifier as parameters. The processor 105 can access the memory at the address provided and determine whether a realm entry context 150 is present at that memory location. If the data stored at that memory address is not a realm entry context, the processor 105 can be configured to throw an exception to halt execution of the secure software module 140.

The example illustrated in FIG. 2 can be used to support multi-threaded execution of the secure software module 140. Each thread or process can be responsible for storing the address of the realm entry context 150 associated with that thread or process. To ensure that an thread or process has not attempted to access the context information associated with another thread or process the realm entry context 150 can include an owner authentication tag. The owner authentication tag can be an authentication tag that is generated using thread or process identifier that uniquely identifies the thread or process that is making the real call instruction. The authentication tag can be generated using various techniques and using an encryption key associated with the secure software module 140. The realm call instruction can be configured to accept the address the realm entry context 150 and the thread or process identifier as parameters. The processor 105 can access the memory at the address provided and determine whether a realm entry context 150 is present at that memory location. If the data stored at that memory address is not a realm entry context, the processor 105 can be configured to throw an exception to halt execution of the secure software module 140. If a realm entry context 150 is present at the specified address, the processor 105 can be configured to extract the owner authentication tag from the realm entry context 150. The processor 105 can also determine an owner authentication tag based on the thread or process identifier and compare that to the owner authentication tag extracted from the realm entry context 150. If the determined owner authentication tag does not match the owner authentication tag extracted from the realm entry context 150, the processor can be configured to throw an exception to halt execution of the secure software module 140.

FIG. 3 is a flow diagram of an example process for protecting software in a computing device according to the techniques disclosed herein. The process illustrated in FIG. 3 can be implemented by the processor 105 of the computing device 100 illustrated in FIGS. 1 and 2.

A request can be received from a non-secure software module to execute an instruction of a secure software module comprising encrypted program code (stage 305). The non-secure software module can comprise an application installed on the computing device, a component of the HLOS of the computing device, and/or other software on the computing device that does not comprise a secure software module 140. The secure software module 140 can comprise program code that has intellectual property value that the developer of the software wishes to prevent others from extracting from the software. The non-secure software can be segregated from the secure software module 140 by storing the secure software module in a trusted portion of the memory separate from the unprotected software. The program code of the secure software module 140 can also be encrypted using an encryption key associated with the secure software module 140 to prevent an attacker from making use of the source code if the source code were obtained. The non-secure software can be configured to use one or more secure software modules 140 to process data and/or to perform other tasks. The non-secure software module can be configured to include an instruction that references an instruction of the secure software module. The processor of the computing device can be configured to execute this instruction which references an address of an instruction of the secure software module.

A determination can be made whether the instruction comprises an instruction associated with a controlled point of entry to the secure software module accessible outside of the secure software module (stage 310). The computing device 100 discussed herein is configured to control the entry into and the exit from the secure software module, to prevent an attacker from jumping into the secure software module at an instruction other than the controlled point of entry into the secure software module. The computing device can be configured such that decryption of the software instructions of the secure software module and/or the data associated with the secure software module can only be initiated if the execution of the secure software module begins with a call to the instruction comprising the controlled point of entry into the secure software module. For example, the controlled point of entry can comprise a realm call instruction, such as the realm call instruction 135 discussed above. The realm call instruction 135 can be an unencrypted instruction that can be called by non-secure software modules. The processor 105 of the computing device 100 can be configured to access an address specified in the realm call instruction 135, to decrypt the instruction located at the specified address, and to make a determination whether the instruction at the address specified by the realm call instruction 135 is a realm configuration instruction 145. If address specified in the realm call instruction 135 points to a valid realm configuration instruction 145, the processor 105 of the computing device 100 can be configured to initialize the secure software module and execute one or more instructions of the secure software module.

One or more instructions of the secure software module can be executed responsive to the instruction comprising an instruction associated with the controlled point of entry to the secure software module (stage 315). The processor of the computing device can be configured to execute one or more program instructions associated with the secure software module responsive to the non-secure software module having executed the instruction associated with the controlled point of entry into the secure software module. As discussed above, the program code 155 of the secure software module 140 (also referred to herein as the realm code) can be encrypted, and the processor can be configured to decrypt each instruction just prior to executing the instruction to ensure that the instructions of the program code remain protected at all times. The processor of the computing device can be configured to take one or more steps to prevent the execution of the secure software module responsive to the instruction not being associated with the controlled point of entry. The example process illustrated in FIG. 5 can be used to prevent the entry into the secure software module at an instruction other than the controlled point of entry discussed above. The secure software module 140 can be initiated prior to the one or more instructions being executed. An example initialization process is illustrated in FIG. 7, but the techniques disclosed herein are not limited to the specific implementation illustrated in FIG. 7.

Figure 6:
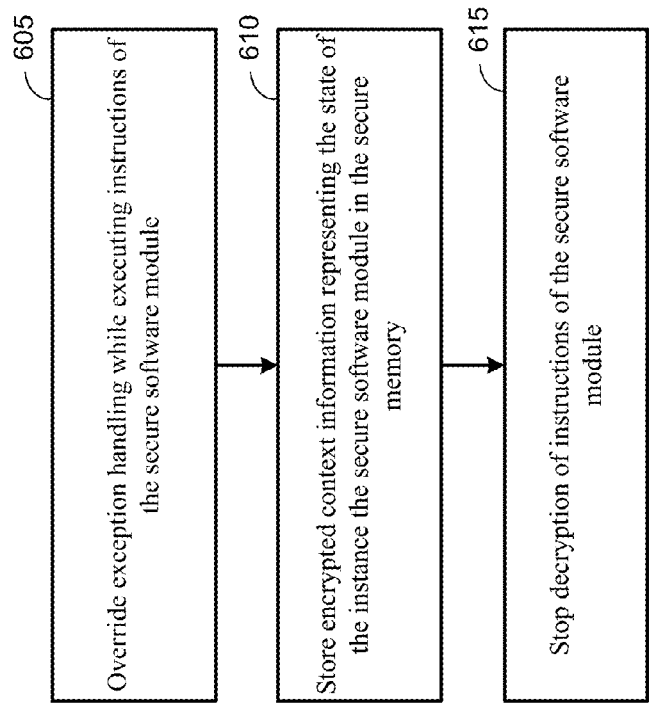
FIG. 6 is a flow diagram of an example process for controlling exit from a secure software module according to the techniques disclosed herein.

Exit from the secure software module can be controlled to return execution to the non-secure software module (stage 320). The computing device 100 is also configured to control the exit from the secure software module without compromising the security of the software instructions comprising the secure software module and/or the data utilized by the secure software module. An attacker may attempt to circumvent the protections on the software instructions and/or the data associated with the secure software module by causing an exception or through other actions that may cause the processor 105 of the computing device 100 to exit the secure software instructions before steps can be taken by the secure software module to clean up data used by the secure software module and/or to stop the decryption of encrypted instructions of the secure software module. The processor 105 of the computing device 100 can be configured to include logic to override exception handling while executing instructions of a secure software module. If an exception occurs while the processor 105 is executing instructions of the secure software module, the processor can be configured to catch the exception and to take steps to clean up the context information representing a current state of the secure software module (or a thread executing the secure software module in a multi-threaded environment), to store an encrypted copy of the context information in a secure memory location, and to stop decryption of the instructions and/or the data of the secure software module An example of such a process is illustrated in FIG. 6, which is discussed in detail below.

FIG. 4 is a flow diagram of an example process for determining whether an instruction is a controlled point of entry into a secure software module according to the techniques disclosed herein. The process illustrated in FIG. 4 can be implemented by the processor 105 of the computing device 100 illustrated in FIGS. 1 and 2. The process illustrated in FIG. 4 can be used to implement, at least in part, stage 310 of the process illustrated in FIG. 3.

An instruction or a realm entry context of the secure software module can be accessed at an address specified in a call instruction executed by the non-secure software module (stage 405). As discussed above, the non-secure software module can be configured to execute a realm call instruction, such as the realm call instruction 135 discussed above. The realm call instruction 135 can be configured to point to the address of an instruction of the secure software module. The processor of the computing device can be configured to access the memory address in the realm code, such as the program code 155 of the secure software module 140 illustrated above. According to the example implementation illustrated in FIG. 1, the address specified in the realm call instruction 135 can point to the controlled entry point for the secure software module, which comprises a realm configuration instruction 145. According to the example implementation illustrated in FIG. 2, the address specified in the realm call instruction can point to the controlled entry point for the secure software module, which comprises a realm entry context 150. The example implementation illustrated in FIG. 1 can be used for single-threaded implementations where a single instance of the secure software module may be executed at a time, and the example implementation illustrated in FIG. 2 can be used for implementations where more than one thread may be executing the program code 155 of secure software module 140 at the same time. Each thread can keep track of an address of the realm entry context 150 associated with that thread and provide that address in the realm call instruction to access the realm entry context 150 associated with that thread. However, the implementation illustrated in FIG. 2 can also be used for single-threaded implementations of the secure software module.

The instruction or the realm entry context found at the address specified in the call instruction can be decrypted using a decryption key specific to the secure software module (stage 410). The processor 105 of the computing device 100 can be configured to access an encryption key associated with the secure software module. The encryption key can be stored in a memory of the computing device 100 which is substantially inaccessible to the non-secure software, such as non-secure software module 130. The processor 105 can be configured to decrypt the instruction or the realm entry context found at the address specified in the call instruction using the encryption key associated with the secure software module. Each secure software module on the computing device can be associated with an encryption key, and the encryption key can be different for each of the secure software modules.

A determination can be made whether the instruction is a configuration instruction associated with the secure software module that represents the controlled point of entry into the secure software module or the realm entry context 150 found at the address specified in the call instruction represents the controlled point of entry into the secure software module (stage 415). Where address specified in the call instruction points to an instruction, the processor 105 of the computing device 100 can be configured to decrypt the instruction as discussed above in stage 410 and then make a determination whether the instruction comprises a real configuration instruction. The realm configuration instruction 145 is configured to point to the realm entry context 150 for the secure software module, and when executed, loads the address of the realm entry context 150 into the REC register 120 of the processor of the computing device. Where address specified in the call instruction points to realm entry context 150, the processor of the computing device can be configured to decrypt the realm entry context 150 as discussed above in stage 410 and then make a determination whether the realm entry context 150 is authentic. The realm entry context 150 can comprise an authentication tag or other value that the processor of the computing device can use to determine that the realm configuration information is legitimate. The processor 105 of the computing device 100 can be configured to throw an exception and/or take other actions responsive to the address specified in the realm call instruction not pointing to a realm configuration instruction or a realm entry context to prevent an attacker from entering jumping into the secure software module at an unauthorized entry point in an attempt to extract information about the program code and/or data processed by the secure program code.

Figure 5:
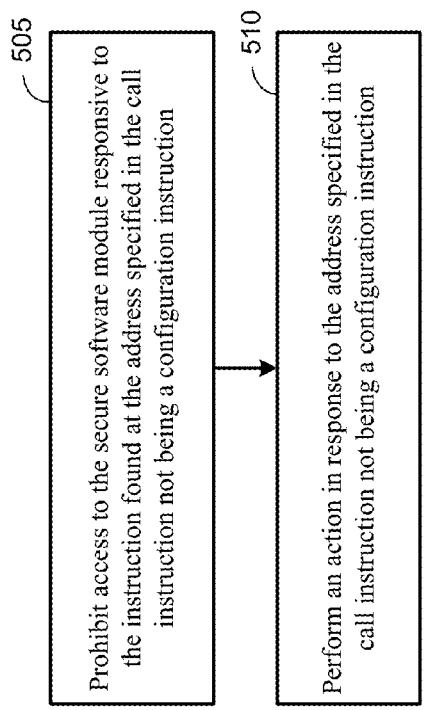
FIG. 5 is a flow diagram of an example process for protecting software in a computing device according to the techniques disclosed herein.

FIG. 5 is a flow diagram of an example process for protecting software in a computing device according to the techniques disclosed herein. The process illustrated in FIG. 5 can be implemented by the processor 105 of the computing device 100 illustrated in FIGS. 1 and 2. The process illustrated in FIG. 5 can be implemented as part of the process illustrated in FIG. 3.

Access to the secure software module can be prohibited responsive to the instruction found at the address specified in the call instruction not being a configuration instruction or a realm entry context 150 (stage 505). The processor 105 of the computing device 100 can be configured to perform one or more actions that prevent access to the secure software module in response to the address specified in the realm call instruction not pointing to a realm call instruction or a realm entry context 150. The processor 105 can be configured to clear the decryption key associated with the secure software module from a register of the processor 105 so that subsequent fetches of software instructions of the secure software module would return an encrypted value that is not executable by the processor of the computing device.

An action can be performed in response to the address specified in the call instruction not being that of a configuration instruction or a real entry context (stage 510). The processor 105 of the computing device 100 can also be configured to perform one or more other actions in response to the address specified in the call instruction not being that of a configuration instruction or a real entry context. The processor 105 can be configured to throw an exception that can halt the execution of the non-secure software that called the secure software module. Such an approach can be used to prevent non-secure software from probing the secure software module in an attempt to extract information about the program code and/or the data utilized by the secure software module. The processor 105 can be configured to return execution to the non-secure software module in some implementations and the non-secure software module can be configured to handle the error condition or error conditions caused by the inability to execute the secure software module. In yet other implementations, the processor 105 can be configured to throw an exception or otherwise indicate an error condition to the HLOS of the computing device, which can be configured to take one or more actions including, but not limited to, rebooting the computing device, halting the execution of the non-secure software, and/or preventing the execution of the non-secure software on the computing device.

FIG. 6 is a flow diagram of an example process for controlling exit from a secure software module according to the techniques disclosed herein. The process illustrated in FIG. 6 can be implemented by the processor 105 of the computing device 100 illustrated in FIGS. 1 and 2. The process illustrated in FIG. 4 can be used to implement, at least in part, stage 320 of the process illustrated in FIG. 3.

Exception handling while executing instructions of the secure software module can be overridden (stage 605). The processor of the computing device can be configured to override exception handling 115 while executing program code of the secure software module. An attacker may attempt to cause an exception in the secure software module to cause the processor to halt the execution of the secure software module in an attempt to expose data and/or program code of the secure software module. Halting the execution of the secure software module while the module is in an intermediate state could result in the program code of the secure software module leaving behind intermediate data that an attacker could use to deduce implementation details about the secure software module. Furthermore, the decryption key used to decrypt the encrypted instructions of the secure software module and the real context information could be exposed. The processor can be configured to override exception handling until a return instruction is executed indicating that execution of the secure software module has completed and the execution of the non-secure software module is to resume, or an error or exception occurs which would cause the termination of the secure software module.

Encrypted context information representing the state of the instance the secure software module in the secure memory can be stored (stage 610). Information representing the current state of the secure software module can be encrypted and stored as realm entry context 150. The realm entry context 150 comprises information that can be used to restore the state of the secures software module after a context switch in which the processor of the computing device executes other program code. Where the secure software module is configured to support multi-threading, the realm entry context 150 can be thread-specific, and the thread can be configured to keep track of the address of the realm entry context 150 associated with that thread. Otherwise, the realm entry context 150 can be stored at a memory address that is specified by the realm configuration instruction, and the realm configuration instruction can access the realm entry context once the processor resumes execution of the secure software module.

Decryption of instructions of the secure software module can be stopped (stage 615). The processor of the computing device can be configured to stop decrypting instructions associated with the secure module as part of the controlled exit from the secure software module. The processor can be configured to clear the copy of the encryption key or keys used to decrypt the encrypted instructions of the secure software module from a memory location in which the encryption key or keys have been stored. The encryption key or keys may be stored in a register or registers of the processor of the computing device and the processor can be configured to clear the values stored in the register or registers.

FIG. 7 is a flow diagram of an example process for initializing a secure software module according to the techniques disclosed herein. The process illustrated in FIG. 7 can be implemented by the processor 105 of the computing device 100 illustrated in FIGS. 1 and 2. The process illustrated in FIG. 7 can be used to implement, at least in part, stage 315 of the process illustrated in FIG. 3.

An instance of the secure software module can be initialized (stage 705). As discussed above, the realm call instruction can serve as a controlled point of entry into the secure software module 140, the realm call instruction can be configured to point to an address of the realm configuration instruction. The realm configuration instruction can be configured to execute one or more software instructions prepare the secure software module 140 for execution. The initialization process can include determining a current state of the secure software module 140.

The secure software module 140 may be in a free state, a running state, or a paused state. The running state indicates that the secure software module 140 is currently being executed by another thread or another process, and the processor 105 can be configured to block execution of the program code of the secure software module 140 until the secure software module 140 is returned to a free state by the other thread or process that is executing the program code of the secure software module 140. The paused state indicates that the secure software module 140 is currently reserved by another thread or process that is not currently executing the program code of the secure software module 140, but the other thread or process was in the process of executing the program code of the secure software module 140 and will be returning to continue executing of the program code of the secure software module 140 after completing some other task. The paused state can be used to allow for the execution of unprotected program code that is outside of the secure software module 140. For example, an instruction of the program code of the secure software module 140 may rely on an unprotected shared library to perform one or more computations. The instruction of the secure software module 140 can be configured to cause the processor 105 to call a program instruction that when executed saves the current state of the secure software module 140 in the realm entry context 150 and sets an indicator of the secure software module 140 that the secure software module 140 is in a paused state, before jumping to the instruction outside of the secure software module 140. Once the execution of the instruction or instructions outside of the secure software module 140 is completed, the processor 105 can return execution to the secure software module 140. The processor 105 can be configured to push the address of the realm call instruction onto the program stack, and the realm call instruction can executed the realm configuration instruction to load the realm entry context 150 and restore the state of the secure software module 140 prior to pausing the execution. The state of the secure software module 140 can be returned to the running state.

If the secure software module 140 is currently in a free state, the secure software module 140 is not currently being executed by another thread or process and can be initialized and the process can continue with stage 705. Otherwise, the processor 105 can be configured to block at stage 705 until the state of the secure software module 140 returns to the free state.

In a multi-threaded implementation of the secure software module 140, such as that illustrated in FIG. 2, the secure software module 140 may be in a paused state due to a context switch from another thread or process to a current thread or process or may be in a running state. In such a situation, the current thread or process will be associated with its own realm entry context 150 and can begin executing the secure software module 140 as if the secure software module 140 were in a free state as discussed above with respect to the single-threaded version of the secure software module 140.

Encrypted context information representing a state of the instance of the secure software module can be accessed (stage 710). The processor 105 can be configured to access the realm entry context 150 information stored in the secure software module 140 associated with the secure software module 140. The realm entry context 150 is encrypted and can include authentication information, such as an authentication tag, that can be used to determine whether the realm entry context 150 has been altered since the authentication tag has been generated. The processor 105 can be configured to regenerate the authentication tag for the realm entry context 150 using an encryption key associated with the secure software module. If the regenerated authentication tag and the authentication tag associated with the realm entry context 150 do not match, the processor 105 can be configured to throw an exception to halt the execution of the secure software module 140. The realm entry context 150 may have been corrupted or tampered with and the execution of the secure software module 140 should be halted to ensure that if an attack is being performed on the secure software module 140. The processor 105 can be configured to override exception processing while executing program code 155 of the secure software module 140 and the can perform various actions as discussed above with respect to FIG. 6 to clean up prior to halting executing of the secure software module 140.

In a single threaded implementation of the secure software module 140, the realm configuration instruction can be configured to point to an address of the realm entry context 150 and to load the address of the realm entry context 150 into the REC register 120 of the processor 105 so that the processor 105 can access the realm entry context 150 as needed, such as upon the occurrence of a return instruction or an exception. Alternatively, in other implementations including multi-threaded implementations, the address of the realm entry context 150 can be provided as a parameter of the realm call instruction. A thread or process can be responsible for storing the address of the realm entry context 150 associated with that thread or process. In such an implementation, the functionality of the realm call instruction and the realm configuration instruction may be merged into the realm call instruction. Alternatively, the realm call instruction may call the realm configuration instruction and pass the address of the realm entry context 150 associated with the thread or process to the realm configuration instruction, and the realm configuration instruction can proceed to initialize the secure software module 140 using the realm entry context 150 referenced by the address provided with the realm call instruction.

To ensure that an thread or process has not attempted to access the context information associated with another thread or process the realm entry context 150 can include an owner authentication tag. The owner authentication tag can be an authentication tag that is generated using thread or process identifier that uniquely identifies the thread or process that is making the real call instruction. The authentication tag can be generated using various techniques and using an encryption key associated with the secure software module 140. The realm call instruction can be configured to accept the address the realm entry context 150 and the thread or process identifier as parameters. The processor 105 can access the memory at the address provided and determine whether a realm entry context 150 is present at that memory location. If the data stored at that memory address is not a realm entry context, the processor 105 can be configured to throw an exception to halt execution of the secure software module 140. If a realm entry context 150 is present at the specified address, the processor 105 can be configured to extract the owner authentication tag from the realm entry context 150. The processor 105 can also determine an owner authentication tag based on the thread or process identifier and compare that to the owner authentication tag extracted from the realm entry context 150. If the determined owner authentication tag does not match the owner authentication tag extracted from the realm entry context 150, the processor can be configured to throw an exception to halt execution of the secure software module 140.

The realm entry context 150 can be decrypted by the processor 105 using the an encryption key associated with the secure software module 140. The processor 105 can populate one or more registers of the processor 105 using data included in the realm entry context 150 an can perform other actions using this data to restore the context of the secure software module 140. If the secure software module 140 was previously in a paused state, the realm entry context 150 can include state information for the secure software module 140, such as intermediate computational results, and/or other data that the secure software module 140 had created or was using prior to entering into the paused state. If the secure software module 140 was previously in a free state, the realm entry context 150 can include data used to initialize one or more components of the secure software module 140.

Once the realm entry context 150 has been accessed and decrypted, the processor 105 can jump to an instruction of the secure software module 140 and being execution of the secure software module 140. The processor 105 can be configured to decrypt each instruction just prior to execution of the instruction to ensure that the only the instructions currently being executed are in a decrypted state that might be susceptible to an attacker. Once the execution of the program code has completed, a realm return instruction can be executed by the processor 105 to cause the cleanup of the data associated with the secure software module 140, the realm entry context 150 can be updated and encrypted before being stored in the secure software module 140, and the encryption key used to decrypt the instructions of secure software module 140 can be cleared from a register or other memory location of the processor 105.

FIG. 8 is a flow diagram of an example process for executing instructions of a secure software module according to the techniques disclosed herein. The process illustrated in FIG. 3 can be implemented by the processor 105 of the computing device 100 illustrated in FIGS. 1 and 2. The process illustrated in FIG. 8 can be used to implement, at least in part, stage 315 of the process illustrated in FIG. 3.

Each of the one or more instructions of the secure software module can be decrypted just prior to executing the one or more instructions (stage 805). Each of the program instructions of the program code 155 of the secure software module 140 can be stored in an encrypted form and decrypted only as each of the instructions are needed for execution. The processor 105 of the computing device can be configured to access an encryption key associated with the secure software module 140. The encryption key or keys may be stored in the secure software module 140 and may be copied to a register of the processor of the computing device 100. The processor 105 can be configured to decrypt each instruction just prior to the instruction being executed by the processor 105. Decrypting the instructions only as needed can help to maintain the security of the program code comprising the secure software module 140. The encryption keys may also be stored using a key store mechanism implemented in a trusted execution environment of the computing device 100. The key store mechanism can be configured to perform cryptographic operations using the encryption keys stored therein and can be configured to prevent the export of the keys from the key store mechanism. The key store mechanism can be configured to require authentication in order for an encryption key to be used. The realm configuration instruction or the realm call instruction can be configured to load such authentication information from the secure software module 140 at the time that the instance of the secure software module 140 is initialized and the authentication information can be stored in a register of the processor 105. The processor 105 can provide the authentication information to the key store mechanism with data on which a cryptographic operation or operations are to be performed and the results of the operation or operations can be provided to the processor 105 by the key store mechanism.

Figure 9:
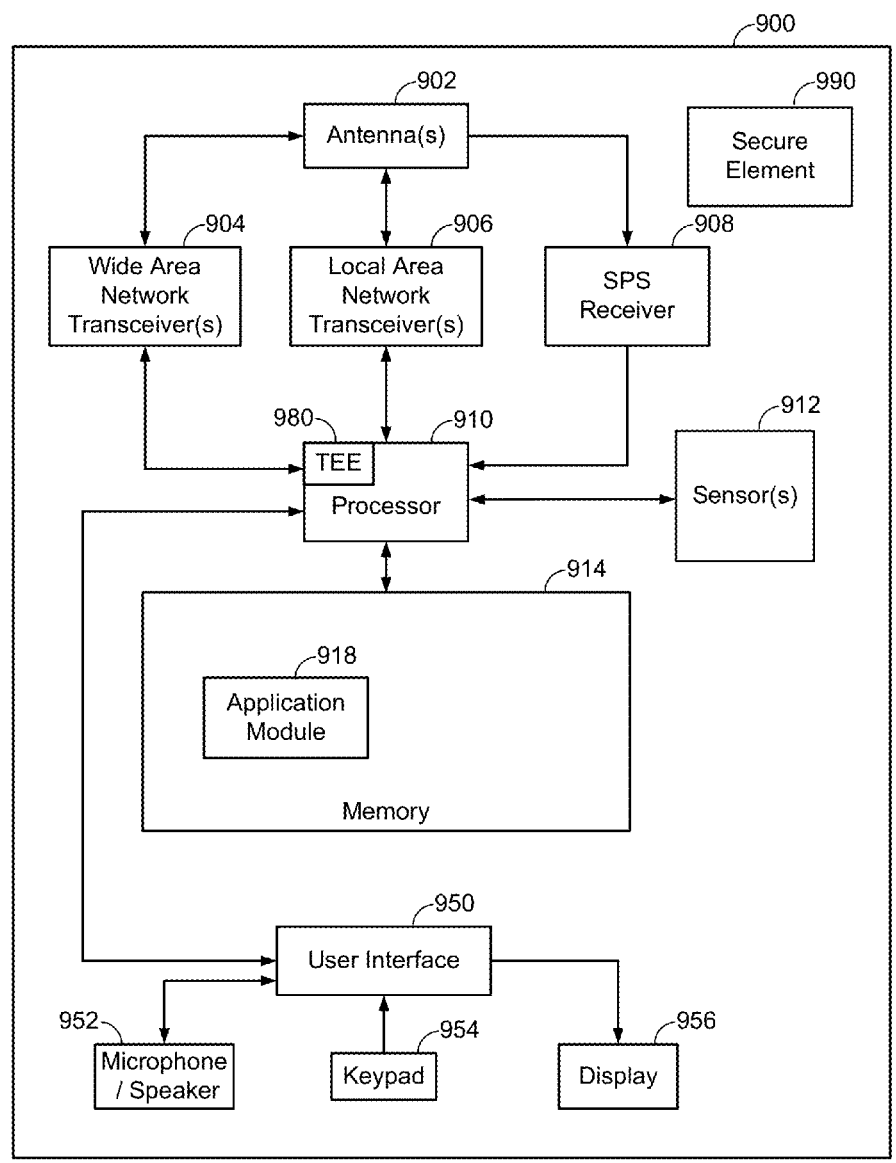
FIG. 9 is a schematic diagram of an example wireless device that can be used to implement the computing device illustrated in FIGS. 1 and 2, in accordance with certain example implementations.

FIG. 9 is a functional block diagram of an example computing device that can be used to implement the computing device 100 illustrated in FIGS. 1 and 2. FIG. 9 is a schematic diagram illustrating various components of an example computing device 900, which may be similar to or the same as the computing device 100 depicted in FIG. 1. For the sake of simplicity, the various features/components/functions illustrated in the schematic boxes of FIG. 9 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 9 may be further subdivided, or two or more of the features or functions illustrated in FIG. 9 may be combined. Additionally, one or more of the features or functions illustrated in FIG. 9 may be excluded.

As shown, the computing device 900 may include one or more local area network transceivers 906 that may be connected to one or more antennas 902. The one or more local area network transceivers 906 comprise suitable devices, circuits, hardware, and/or software for communicating with and/or detecting signals to/from one or more of the WLAN access points, and/or directly with other wireless devices within a network. In some embodiments, the local area network transceiver(s) 906 may comprise a WiFi (802.11x) communication transceiver suitable for communicating with one or more wireless access points; however, in some embodiments, the local area network transceiver(s) 906 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The computing device 900 may also include, in some implementations, one or more wide area network transceiver(s) 904 that may be connected to the one or more antennas 902. The wide area network transceiver 904 may comprise suitable devices, circuits, hardware, and/or software for communicating with and/or detecting signals from one or more of, for example, the WWAN access points and/or directly with other wireless devices within a network. In some implementations, the wide area network transceiver(s) 904 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax (802.16), etc.

In some embodiments, an SPS receiver (also referred to as a global navigation satellite system (GNSS) receiver) 908 may also be included with the computing device 900. The SPS receiver 908 may be connected to the one or more antennas 902 for receiving satellite signals. The SPS receiver 908 may comprise any suitable hardware and/or software for receiving and processing SPS signals. The SPS receiver 908 may request information as appropriate from the other systems, and may perform the computations necessary to determine the position of the computing device 900 using, in part, measurements obtained by any suitable SPS procedure.

As further illustrated in FIG. 9, the example computing device 900 includes one or more sensors 912 coupled to a controller/processor 910. For example, the sensors 912 may include motion sensors to provide relative movement and/or orientation information (which is independent of motion data derived from signals received by the wide area network transceiver(s) 904, the local area network transceiver(s) 906, and/or the SPS receiver 908). By way of example but not limitation, the motion sensors may include an accelerometer, a gyroscope, and a geomagnetic (magnetometer) sensor (e.g., a compass), any of which may be implemented based on micro-electro-mechanical-system (MEMS), or based on some other technology. The one or more sensors 912 may further include, a thermometer (e.g., a thermistor), an audio sensor (e.g., a microphone) and/or other sensors. The one or more sensors 912 may also include a camera (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 910 may be connected to the local area network transceiver(s) 906, the wide area network transceiver(s) 904, the SPS receiver 908 and the one or more sensors 912. The processor may include one or more microprocessors, microcontrollers, and/or digital signal processors that provide processing functions, as well as other calculation and control functionality. The processor 910 may be coupled to storage media (e.g., memory) 914 for storing data and software instructions for executing programmed functionality within the mobile device. The memory 914 may be on-board the processor 910 (e.g., within the same IC package), and/or the memory may be external memory to the processor and functionally coupled over a data bus.

A number of software modules and data tables may reside in memory 914 and may be utilized by the processor 910 in order to manage both communications with remote devices/nodes, perform positioning determination functionality, and/or perform device control functionality. As illustrated in FIG. 9, in some embodiments, the memory 914 may include an application module 918 which can implement one or more applications. It is to be noted that the functionality of the modules and/or data structures may be combined, separated, and/or be structured in different ways depending upon the implementation of the computing device 900. The application module 918 can comprise one or more trusted applications that can be executed by the trusted execution environment 980 or the secure element 990 of the computing device 900.

The application module 918 may be a process or thread running on the processor 910 of the computing device 900, which may request data from one or more other modules (not shown) of the computing device 900. Applications typically run within an upper layer of the software architectures and may be implemented in a rich execution environment of the computing device 900, and may include indoor navigation applications, shopping applications, location aware service applications, etc.

The processor 910 may include a trusted execution environment 980 and/or the computing device 900 may include a secure element 990. The trusted execution environment 980 and/or the secure element 990 can be used to implement a secure processing environment for implementing the processes for executing a secure software module illustrated above. The trusted execution environment 980 can be implemented as a secure area of the processor 910 that can be used to process and store sensitive data in an environment that is segregated from the rich execution environment in which the operating system and/or applications (such as those of the application module 918) may be executed. The trusted execution environment 980 can be configured to execute trusted applications that provide end-to-end security for sensitive data by enforcing confidentiality, integrity, and protection of the sensitive data stored therein. The trusted execution environment 980 can be used to store encryption keys, anti-replay counter data, and/or other sensitive data. Furthermore, the trusted execution environment 980 can be used to implement the various processes illustrated in FIGS. 1-8 and discussed herein. The trusted application environment can be configured to store data and/or executable program instructions in the memory 914, and the data stored in the memory 914 can be encrypted and authenticated to ensure that the data cannot be utilized or modified by non-trusted processes.

The computing device 900 may include a secure element 990 (also referred to herein as a trusted component). The computing device 900 may include the secure element 990 in addition to or instead of the trusted execution environment 980. The secure element 990 can comprise autonomous and tamper-resistant hardware that can be used to execute secure applications and the confidential data associated with such applications. The secure element 990 can be used to store encryption keys, anti-replay counter data, and/or other sensitive data. The secure element 990 can comprise a Near Field Communication (NFC) tag, a Subscriber Identity Module (SIM) card, or other type of hardware device that can be used to securely store data. The secure element 990 can be integrated with the hardware of the computing device 900 in a permanent or semi-permanent fashion or may, in some implementations, be a removable component of the computing device 900 that can be used to securely store data and/or provide a secure execution environment for applications.

The computing device 900 may further include a user interface 950 providing suitable interface systems, such as a microphone/speaker 952, a keypad 954, and a display 956 that allows user interaction with the computing device 900. The microphone/speaker 952 (which may be the same or different from the audio sensor) provides for voice communication services (e.g., using the wide area network transceiver(s) 904 and/or the local area network transceiver(s) 906). The keypad 954 may comprise suitable buttons for user input. The display 956 may include a suitable display, such as, for example, a backlit LCD display, and may further include a touch screen display for additional user input modes.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device or external to the device. As used herein the term "memory" refers to any type of long term, short term, volatile, nonvolatile, or other memory and is not to be limited to any particular type of memory or number of memories, or type of media upon which memory is stored. If implemented in-part by hardware or firmware along with software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network.

Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

What is claimed:

1. A method for protecting software in a computing device, the method comprising:
 receiving a request from a non-secure software module to execute an instruction of a secure software module comprising encrypted program code;
 determining whether the instruction comprises an instruction associated with a controlled point of entry to the secure software module accessible outside of the secure software module;
 determining whether the secure software module is in a free state in which no instance of the secure software module is being executed responsive to the instruction comprising an instruction associated with the controlled point of entry to the secure software module, wherein determining whether the secure software module is in the free state comprises
  accessing encrypted context information stored in a secure memory location associated with the controlled point of entry into the secure software module, and
  decrypting the encrypted context information to determine a state of the secure software module;
 blocking execution of the secure software module until the secure software module returns to the free state;
 executing one or more instructions of the secure software module responsive to the secure software module being in the free state; and
 controlling exit from the secure software module to return execution to the non-secure software module.

2. The method of claim 1, wherein the instruction comprises a call instruction, and wherein determining whether the instruction comprises the instruction associated with the controlled point of entry to the secure software module accessible outside of the secure software module further comprises:
 accessing an instruction of the secure software module at an address specified in the call instruction executed by the non-secure software module;
 decrypting the instruction found at the address specified in the call instruction using a decryption key specific to the secure software module; and
 determining whether the instruction found at the address specified in the call instruction is a configuration instruction associated with the secure software module that represents the controlled point of entry into the secure software module.

3. The method of claim 2, further comprising:
 prohibiting access to the secure software module responsive to the instruction found at the address specified in the call instruction not being the configuration instruction; and
 performing an action in response to the address specified in the call instruction not being the configuration instruction.

4. The method of claim 1, wherein executing the one or more instructions of the secure software module responsive to the instruction comprising an instruction associated with the controlled point of entry to the secure software module further comprises:

initializing an instance of the secure software module.

5. The method of claim 4, wherein initializing the instance of the secure software module comprises:

accessing the encrypted context information representing the state of the instance of the secure software module.

6. The method of claim 4, wherein controlling the exit from the secure software module to return execution to the non-secure software module further comprises:

storing encrypted context information representing the state of the instance the secure software module in the secure memory; and stopping decryption of instructions of the secure software module.

7. The method of claim 4, wherein controlling the exit from the secure software module to return execution to the non-secure software module further comprises:

overriding exception handling while executing instructions of the secure software module;

storing encrypted context information representing the state of the instance the secure software module in the secure memory; and stopping decryption of instructions of the secure software module responsive to an exception occurring.

8. The method of claim 1, wherein executing the one or more instructions of the secure software module responsive to the instruction comprising an instruction associated with the controlled point of entry to the secure software module further comprises:

decrypting each of the one or more instructions of the secure software module associated with an instance of the secure software module being executed just prior to executing the one or more instructions.

9. The method of claim 8, wherein decrypting each of the one or more instructions of the secure software module associated with the instance of the secure software module being executed just prior to executing the one or more instructions further comprises:

decrypting each of the one or more instructions using an encryption key that is associated with the secure software module.

10. An apparatus comprising:

a memory;

a processor communicably coupled to the memory, wherein the processor comprises:

means for receiving a request from a non-secure software module to execute an instruction of a secure software module comprising encrypted program code;

means for determining whether the instruction comprises an instruction associated with a controlled point of entry to the secure software module accessible outside of the secure software module;

means for determining whether the secure software module is in a free state in which no instance of the secure software module is being executed responsive to the instruction comprising an instruction associated with the controlled point of entry to the secure software module, wherein the means for determining whether the secure software module is in the free state comprises means for accessing encrypted context information stored in a secure memory location associated with the controlled point of entry into the secure software module, and means for decrypting the encrypted context information to determine a state of the secure software module;

means for blocking execution of the secure software module until the secure software module returns to the free state;

means for executing one or more instructions of the secure software module responsive to the secure software module being in the free state; and means for controlling exit from the secure software module to return execution to the non-secure software module.

11. The apparatus of claim 10, wherein the instruction comprises a call instruction, and wherein the means for determining whether the instruction comprises the instruction associated with the controlled point of entry to the secure software module accessible outside of the secure software module further comprises:

means for accessing an instruction of the secure software module at an address specified in the call instruction executed by the non-secure software module;

means for decrypting the instruction found at the address specified in the call instruction using a decryption key specific to the secure software module; and means for determining whether the instruction found at the address specified in the call instruction is a configuration instruction associated with the secure software module that represents the controlled point of entry into the secure software module.

12. The apparatus of claim 11, further comprising:

means for prohibiting access to the secure software module responsive to the instruction found at the address specified in the call instruction not being the configuration instruction; and means for performing an action in response to the address specified in the call instruction not being the configuration instruction.

13. The apparatus of claim 10, wherein the means for executing the one or more instructions of the secure software module responsive to the instruction comprising an instruction associated with the controlled point of entry to the secure software module further comprises:

means for initializing an instance of the secure software module.

14. The apparatus of claim 13, wherein the means for initializing the instance of the secure software module comprises:

means for accessing the encrypted context information representing the state of the instance of the secure software module.

15. The apparatus of claim 13, wherein the means for controlling the exit from the secure software module to return execution to the non-secure software module further comprises:

means for storing encrypted context information representing the state of the instance the secure software module in the secure memory; and means for stopping decryption of instructions of the secure software module.

16. The apparatus of claim 13, wherein the means for controlling the exit from the secure software module to return execution to the non-secure software module further comprises:

means for overriding exception handling while executing instructions of the secure software module;

means for storing encrypted context information representing the state of the instance the secure software module in the secure memory; and means for stopping decryption of instructions of the secure software module responsive to an exception occurring.

17. An apparatus comprising:
a memory; and
a processor coupled to the memory, the processor configured to:
   receive a request from a non-secure software module to execute an instruction of a secure software module comprising encrypted program code;
   determine whether the instruction comprises an instruction associated with a controlled point of entry to the secure software module accessible outside of the secure software module;
   determine whether the secure software module is in a free state in which no instance of the secure software module is being executed responsive to the instruction comprising an instruction associated with the controlled point of entry to the secure software module, wherein the processor is configured to
   access encrypted context information stored in a secure memory location associated with the controlled point of entry into the secure software module, and
   decrypt the encrypted context information to determine a state of the secure software module;
   block execution of the secure software module until the secure software module returns to the free state;
   execute one or more instructions of the secure software module responsive to the secure software module being in the free state; and
   control exit from the secure software module to return execution to the non-secure software module.

18. The apparatus of claim 17, wherein the instruction comprises a call instruction, and wherein the processor being configured to determine whether the instruction comprises the instruction associated with the controlled point of entry to the secure software module accessible outside of the secure software module is further configured to:
   access an instruction of the secure software module at an address specified in the call instruction executed by the non-secure software module;
   decrypt the instruction found at the address specified in the call instruction using a decryption key specific to the secure software module; and
   determine whether the instruction found at the address specified in the call instruction is a configuration instruction associated with the secure software module that represents the controlled point of entry into the secure software module.

19. The apparatus of claim 18, wherein the processor is further configured to:
   prohibit access to the secure software module responsive to the instruction found at the address specified in the call instruction not being the configuration instruction; and
   perform an action in response to the address specified in the call instruction not being the configuration instruction.

20. The apparatus of claim 17, wherein the processor being configured to execute the one or more instructions of the secure software module responsive to the instruction comprising an instruction associated with the controlled point of entry to the secure software module is further configured to:
   initialize an instance of the secure software module.

21. The apparatus of claim 20, wherein the processor being configured to initialize the instance of the secure software module is further configured to:
   access the encrypted context information representing the state of the instance of the secure software module.

22. The apparatus of claim 20, wherein the processor being configured to control the exit from the secure software module to return execution to the non-secure software module is further configured to:
   store encrypted context information representing the state of the instance the secure software module in the secure portion of the memory; and
   stop decryption of instructions of the secure software module.

23. The apparatus of claim 20, wherein the processor being configured to control the exit from the secure software module to return execution to the non-secure software module is further configured to:
   override exception handling while executing instructions of the secure software module;
   store encrypted context information representing the state of the instance the secure software module in the secure portion of the memory; and
   stop decryption of instructions of the secure software module responsive to an exception occurring.

24. A non-transitory, computer-readable medium, having stored thereon computer-readable instructions for protecting software in a computing device, comprising instructions configured to cause the computing device to:
   receive a request from a non-secure software module to execute an instruction of a secure software module comprising encrypted program code;
   determine whether the instruction comprises an instruction associated with a controlled point of entry to the secure software module accessible outside of the secure software module;
   determine whether the secure software module is in a free state in which no instance of the secure software module is being executed responsive to the instruction comprising an instruction associated with the controlled point of entry to the secure software module, wherein the instructions to cause the computing device to determine whether the secure software module is in the free state comprise instructions configured to cause the computing device to
   access encrypted context information stored in a secure memory location associated with the controlled point of entry into the secure software module, and
   decrypt the encrypted context information to determine a state of the secure software module;
   block execution of the secure software module until the secure software module returns to the free state;
   execute one or more instructions of the secure software module responsive to the secure software module being in the free state; and
   control exit from the secure software module to return execution to the non-secure software module.

25. The non-transitory, computer-readable medium of claim 24, wherein the instruction comprises a call instruction, and wherein the instructions configured to cause the computing device to determine whether the instruction comprises the instruction associated with the controlled point of entry to the secure software module accessible outside of the secure software module further comprise instructions configured to cause the computing device to:

access an instruction of the secure software module at an address specified in the call instruction executed by the non-secure software module;

decrypt the instruction found at the address specified in the call instruction using a decryption key specific to the secure software module; and determine whether the instruction found at the address specified in the call instruction is a configuration instruction associated with the secure software module that represents the controlled point of entry into the secure software module.

26. The non-transitory, computer-readable medium of claim 25, further comprising instructions configured to cause the computing device to:

prohibit access to the secure software module responsive to the instruction found at the address specified in the call instruction not being the configuration instruction; and perform an action in response to the address specified in the call instruction not being the configuration instruction.

27. The non-transitory, computer-readable medium of claim 24, wherein the instructions configured to cause the computing device to execute the one or more instructions of the secure software module responsive to the instruction comprising an instruction associated with the controlled point of entry to the secure software module further comprise instructions configured to cause the computing device to:

initialize an instance of the secure software module.

28. The non-transitory, computer-readable medium of claim 27, wherein the instructions configured to cause the computing device to initialize the instance of the secure software module further comprise instructions configured to cause the computing device to:

access the encrypted context information representing the state of the instance of the secure software module.

29. The non-transitory, computer-readable medium of claim 27, wherein the instructions configured to cause the computing device to control the exit from the secure software module to return execution to the non-secure software module is further configured further comprise instructions configured to cause the computing device to:

store encrypted context information representing the state of the instance the secure software module in the secure memory; and stop decryption of instructions of the secure software module.

30. The non-transitory, computer-readable medium of claim 27, wherein the instructions configured to cause the computing device to control the exit from the secure software module to return execution to the non-secure software module further comprise instructions configured to cause the computing device to:

override exception handling while executing instructions of the secure software module;

store encrypted context information representing the state of the instance the secure software module in the secure memory; and stop decryption of instructions of the secure software module responsive to an exception occurring.

* * * * *